(12) United States Patent
Bergami et al.

(10) Patent No.: US 7,396,221 B2
(45) Date of Patent: Jul. 8, 2008

(54) MOULD FOR FORMING THE HEADPIECE OF DEFORMABLE TUBULAR PLASTIC CONTAINERS

(75) Inventors: Stefano Bergami, Bologna (IT); Zeno Zuffa, Bologna (IT)

(73) Assignee: Sacmi Cooperativa Meccanici Imola Soc. Coop. A.R.L., Imola (IT)

( * ) Notice: Subject to any disclaimer, the term of this patent is extended or adjusted under 35 U.S.C. 154(b) by 446 days.

(21) Appl. No.: 10/497,232

(22) PCT Filed: Dec. 5, 2002

(86) PCT No.: PCT/EP02/13877

§ 371 (c)(1),
(2), (4) Date: Feb. 8, 2005

(87) PCT Pub. No.: WO03/053649

PCT Pub. Date: Jul. 3, 2003

(65) Prior Publication Data

US 2005/0147709 A1    Jul. 7, 2005

(30) Foreign Application Priority Data

Dec. 12, 2001  (IT)  .................. RE2001A000119

(51) Int. Cl.
    *B29C 45/14*    (2006.01)
(52) U.S. Cl. ..................................... 425/112
(58) Field of Classification Search .............. 425/112, 425/393
    See application file for complete search history.

(56) References Cited

U.S. PATENT DOCUMENTS 3,425,093 A * 2/1969 Cyril .................. 425/389

(Continued)

FOREIGN PATENT DOCUMENTS

CH    456 128    5/1968

(Continued)

*Primary Examiner*—Robert B Davis
(74) *Attorney, Agent, or Firm*—Browdy and Neimark

(57) ABSTRACT

The mould comprises a punch (10) having an outer surface (11') arranged to engage the container tubular body (51) as an exact fit, and an end portion (13) projecting axially from the lower end of the cylindrical outer surface (11'), and a die (30) arranged to form, in combination with the lower surface (13') of the punch, a cavity (F) for forming the headpiece (52) of the container; the die (30) has a concave surface (32') arranged to receive as an exact fit, by axial penetration, the lower end of the cylindrical outer surface (11') of the punch together with the lower end of the tubular body (51) of the container. The headpiece (52) is formed within the forming cavity (F). According to the invention, the punch (10') comprises a radial deformation means (22, 25, 62, 65), positioned on its outer surface (11') and extending annularly along the entire circumference of this surface to act on the tubular body (51) of the container, and is arranged to assume a normal position in which its outer surface does not project radially from the cylindrical outer surface (11') of the punch, and an active position in which it is urged in a centrifugal direction in such a manner as to press the tubular body (51) against the opposing surface of the die, means being provided to urge the radial deformation means (22, 25, 62, 65) in the centrifugal direction during the forming of the container headpiece (52).

9 Claims, 14 Drawing Sheets

U.S. PATENT DOCUMENTS

| | | | |
|---|---|---|---|
| 3,565,293 A | | 2/1971 | Schultz |
| 3,629,385 A | * | 12/1971 | Badavas et al. ............. 264/154 |
| 3,930,770 A | | 1/1976 | Gaudet et al. |
| 4,155,694 A | * | 5/1979 | Savioli ....................... 425/403 |
| 4,496,513 A | * | 1/1985 | Ishikawa et al. ............ 264/267 |
| 4,834,638 A | * | 5/1989 | Miyahara et al. ............ 425/116 |
| 4,867,663 A | | 9/1989 | Woerner et al. |

FOREIGN PATENT DOCUMENTS

| | | |
|---|---|---|
| EP | 0 810 073 A2 | 12/1997 |
| EP | 0 810 073 A3 | 12/1997 |
| FR | 69 336 | 3/1956 |
| FR | 1 300 212 | 8/1962 |
| FR | 1 486 257 | 6/1967 |
| GB | 800 534 | 8/1958 |

* cited by examiner

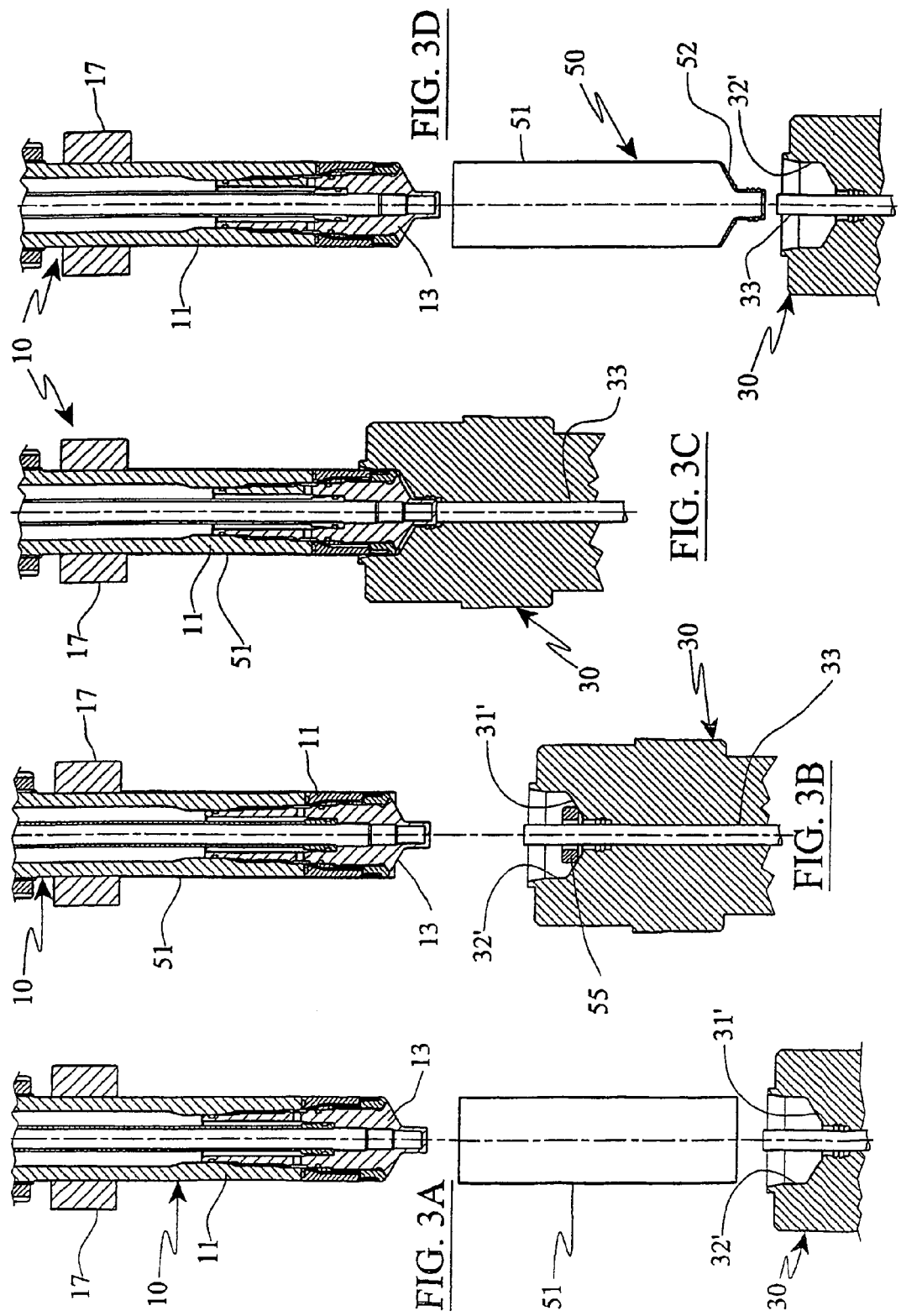

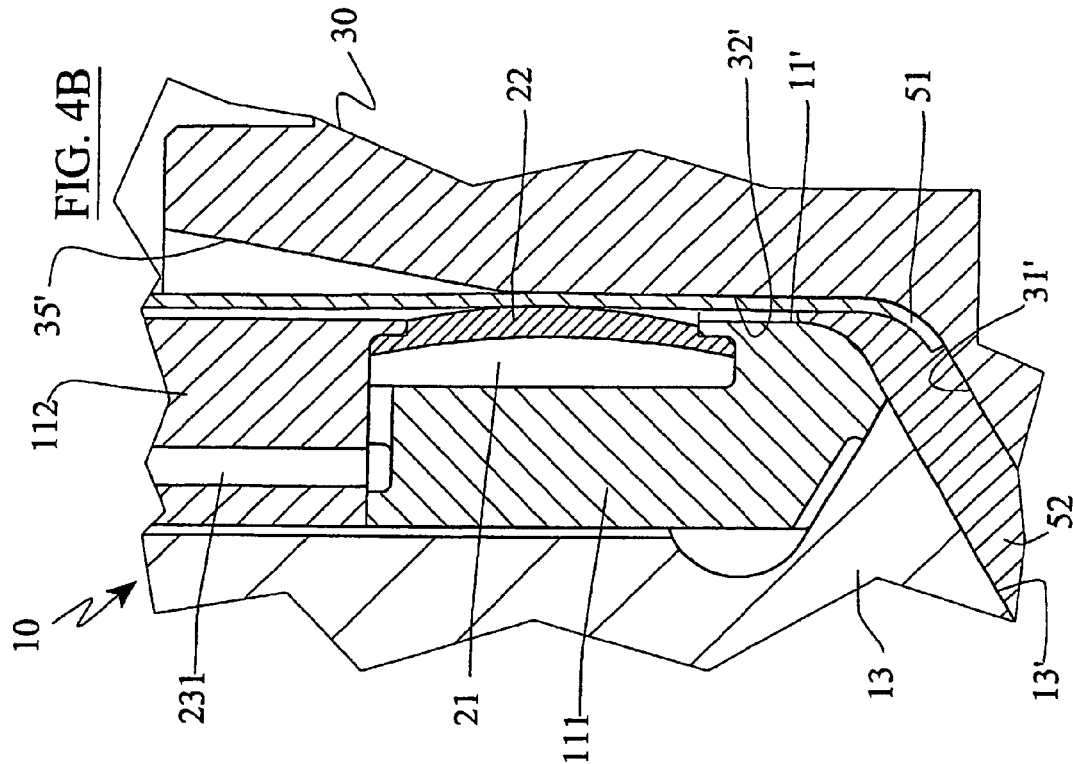
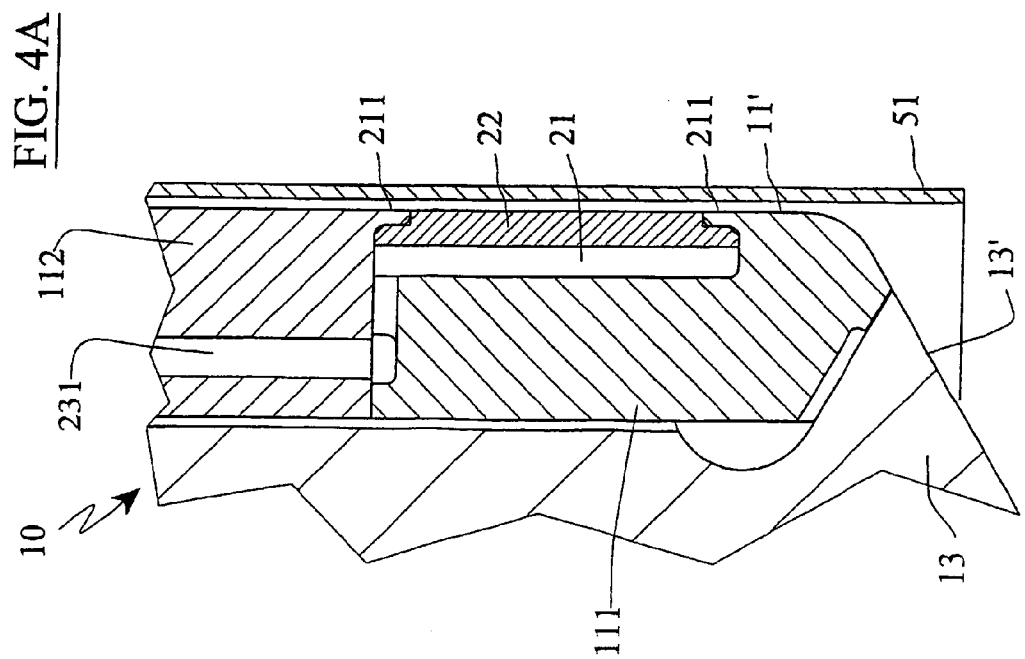

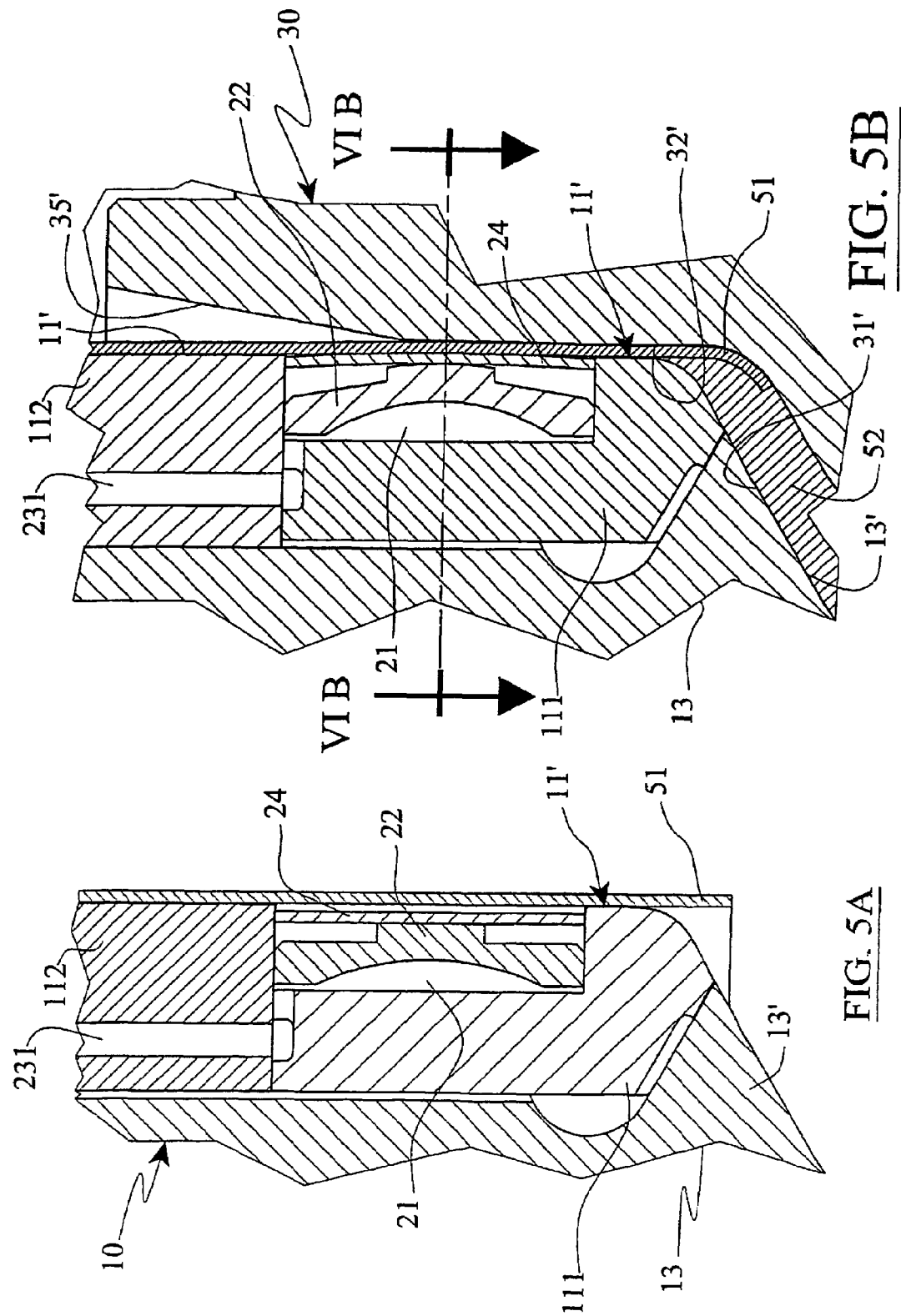

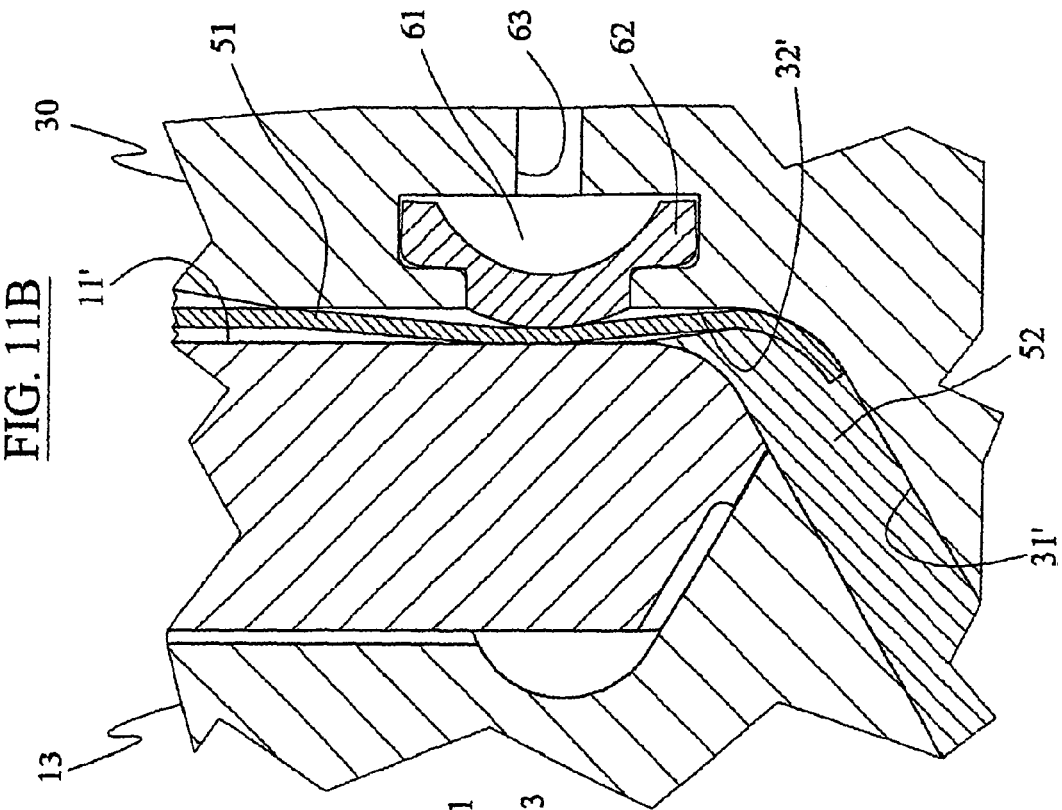
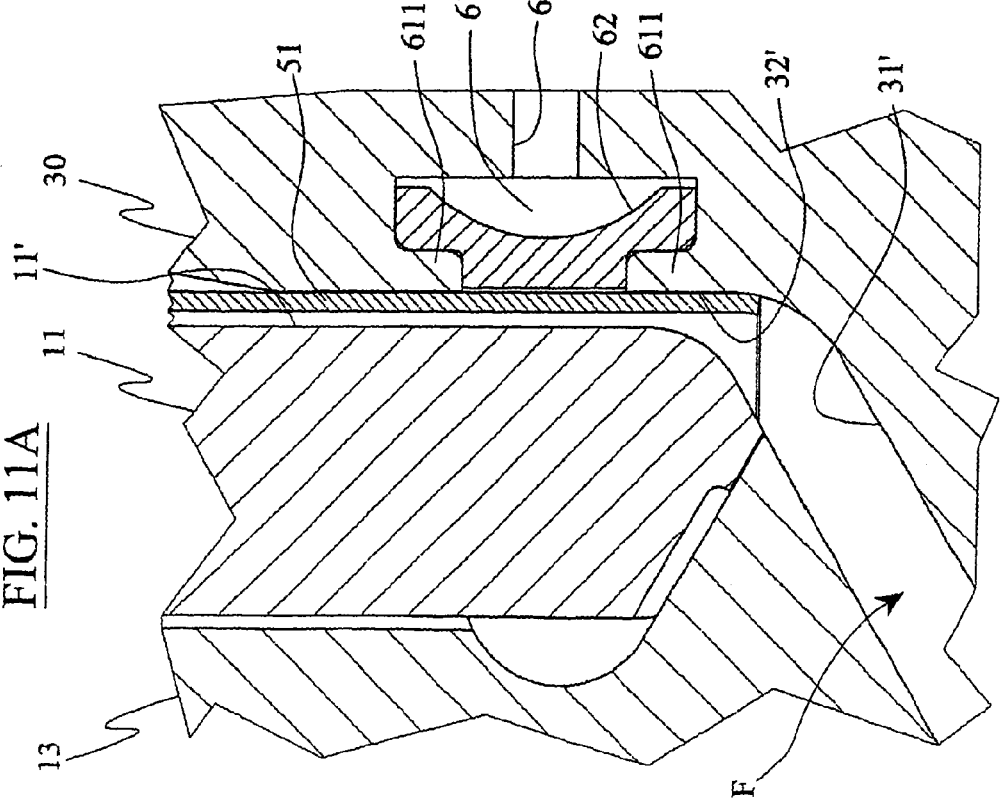

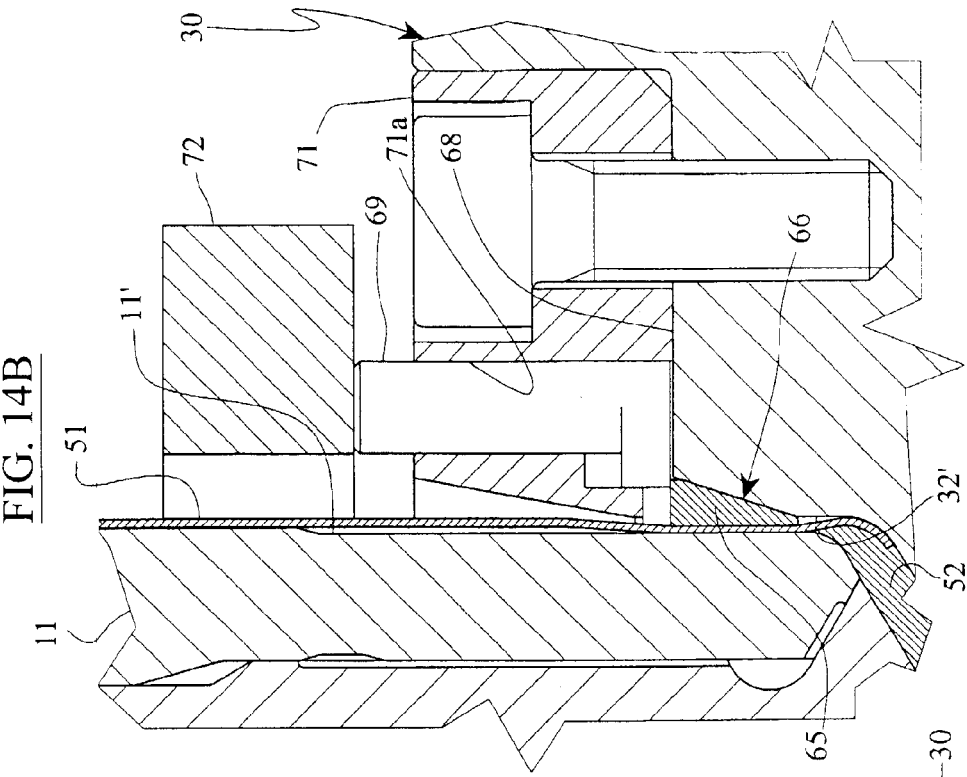
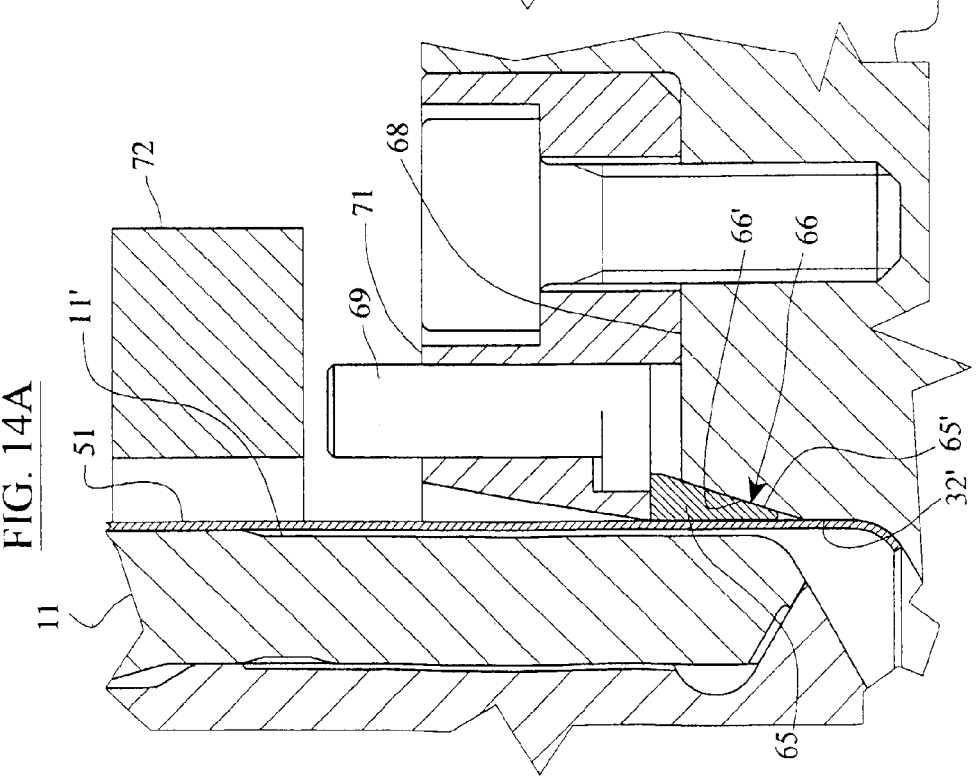

MOULD FOR FORMING THE HEADPIECE OF DEFORMABLE TUBULAR PLASTIC CONTAINERS

TECHNICAL FIELD

This invention relates to the forming of the top portion of deformable tubular plastic containers formed from a tubular body and a plastic headpiece bonded to one end of the tubular body.

BACKGROUND ART

For this purpose, moulds are known comprising a punch having a lower end portion which penetrates into the cavity of a lowerly positioned die to define, in combination with this latter, a cavity for forming the container headpiece; the punch possesses a cylindrical outer surface arranged to exactly engage the tubular body of the container, the lower end of which is positioned adjacent to the edge of the forming cavity and penetrates through the cylindrical surface of the die as an exact fit, to couple the punch to the die.

The container headpiece is formed within the forming cavity and is hot-bonded under pressure to the lower end of the tubular body, typically by making the punch and die approach each other axially after inserting a plastic blank into the forming cavity; alternatively, this can be done by injecting fluidized plastic into the forming cavity while in the static configuration.

In this manner a tubular container is produced composed of the tubular body and the headpiece, which usually possesses a threaded mouth through which the container contents are extracted.

The mouth of the forming cavity is closed by the lower end portion of the cylindrical surface of the punch, which penetrates axially as an exact fit, together with the lower end of the tubular body, within the cylindrical concave surface of the die. As the pressure in the forming cavity is very high during the forming process, said mutually engaging cylindrical surfaces of the punch and die (with the tubular body interposed) must mate with very little gap therebetween, in particular to prevent upward seepage of the plastic material, which would result in undesirable filament-like protuberances projecting into the container chamber.

Because of this, the insertion of the punch into the die during the mutual axial approach stage is a delicate and critical operation which consequently requires a relatively lengthy time and particular care; moreover the risk of said undesirable filament-like protuberances forming cannot be eliminated in practice.

The applicant is aware of a mould for forming the top of deformable tubular plastic containers comprising a tubular body and a headpiece of plastic material bonded to one end of the tubular body.

The mould comprises a punch having an outer surface arranged to engage the container tubular body as an exact fit, and an end portion projecting axially from the lower end of the cylindrical outer surface).

A die is arranged to form, in combination with the lower surface of the punch, a cavity (F) for forming the headpiece of the container.

Said die has a concave surface arranged to receive as an exact fit, by axial penetration, the lower end of the cylindrical outer surface of the punch together with the lower end of the tubular body of the container.

The headpiece is formed within the forming cavity (F) and is pressure-bonded therein to the lower end of the tubular body by a radial deformation means of the punch, positioned on its outer surface and extending annularly along the entire circumference of this surface to act on the tubular body of the container, said means being arranged to assume a normal position in which its outer surface does not project radially from the cylindrical outer surface of the punch, and an active position in which it is urged in a radial direction in such a manner as to press the tubular body (51) against the opposing surface of the die.

The above features are partially disclosed by EP-A-0810073, but are not suitable to overcome the above said drawbacks.

An object of this invention is to provide a mould able to overcome said drawbacks.

DISCLOSURE OF THE INVENTION

This and further objects are attained by the invention as characterised in the claims.

The invention is based on the fact that the punch comprises a radial deformation means, positioned on its cylindrical outer surface, which extends annularly along the entire circumference of this cylindrical outer surface and acts on the inner surface of the container tubular body in correspondence with the cylindrical concave surface of the die; this means is arranged to assume a normal position in which its outer surface does not project radially from the cylindrical outer surface of the punch, and an active position in which it is urged in a centrifugal direction in such as manner as to press the tubular body against the cylindrical concave surface of the die, means being provided to urge the radial deformation means in a centrifugal direction during the forming of the container headpiece.

The radial deformation means is maintained in its normal position while the tubular body of the container is being fitted over the punch in order not to hinder the penetration of the punch; it is also maintained in its normal position when the punch together with the tubular body is inserted axially within the cylindrical concave surface of the die, again in this case not to hinder punch penetration.

Subsequently, during forming, it is thrust in the centrifugal direction in order to press the container tubular body against the cylindrical concave surface of the die, along the entire circumference of the outer cylindrical surface of the punch.

In this manner an outer sealed region is created which hermetically and effectively seals the forming cavity, whatever the gap existing between the mutually engaging cylindrical surfaces within that region.

According to a different embodiment, said radial deformation means is provided within the die, on the concave surface thereof, and operates by pressing the tubular body against the opposing surface of the punch.

Proper success of the forming operation is therefore assured, even if relatively large gaps are present between the punch and die, with the practical result that the formation stage of the container headpiece is faster, more reliable and problem-free.

The invention is described in detail hereinafter with the aid of the accompanying figures, which illustrate one embodiment thereof by way of non-exclusive example.

FIGS. 3A, 3B, 3C and 3D show that mould part of FIG. 1 in four successive working stages.

FIGS. 4A and 4B show an enlarged detail of that mould part of the preceding figures, relative to the radial deformation means, shown in its normal position and active position respectively.

FIGS. 5A and 5B show an enlarged detail of that mould part of the preceding figures, relative to a modified embodiment of the radial deformation means, shown in its normal position and active position respectively.

FIGS. 7A, 7B and 7C show that mould part of FIG. 7 in three successive working stages.

FIGS. 11A and 11B show an enlarged detail of that mould part of FIG. 10, relative to the radial deformation means, shown in its normal position and active position respectively.

FIGS. 14A and 14B show an enlarged detail of that mould part of FIG. 12, relative to the radial deformation means, shown in its normal position and active position respectively.

Figure 1:
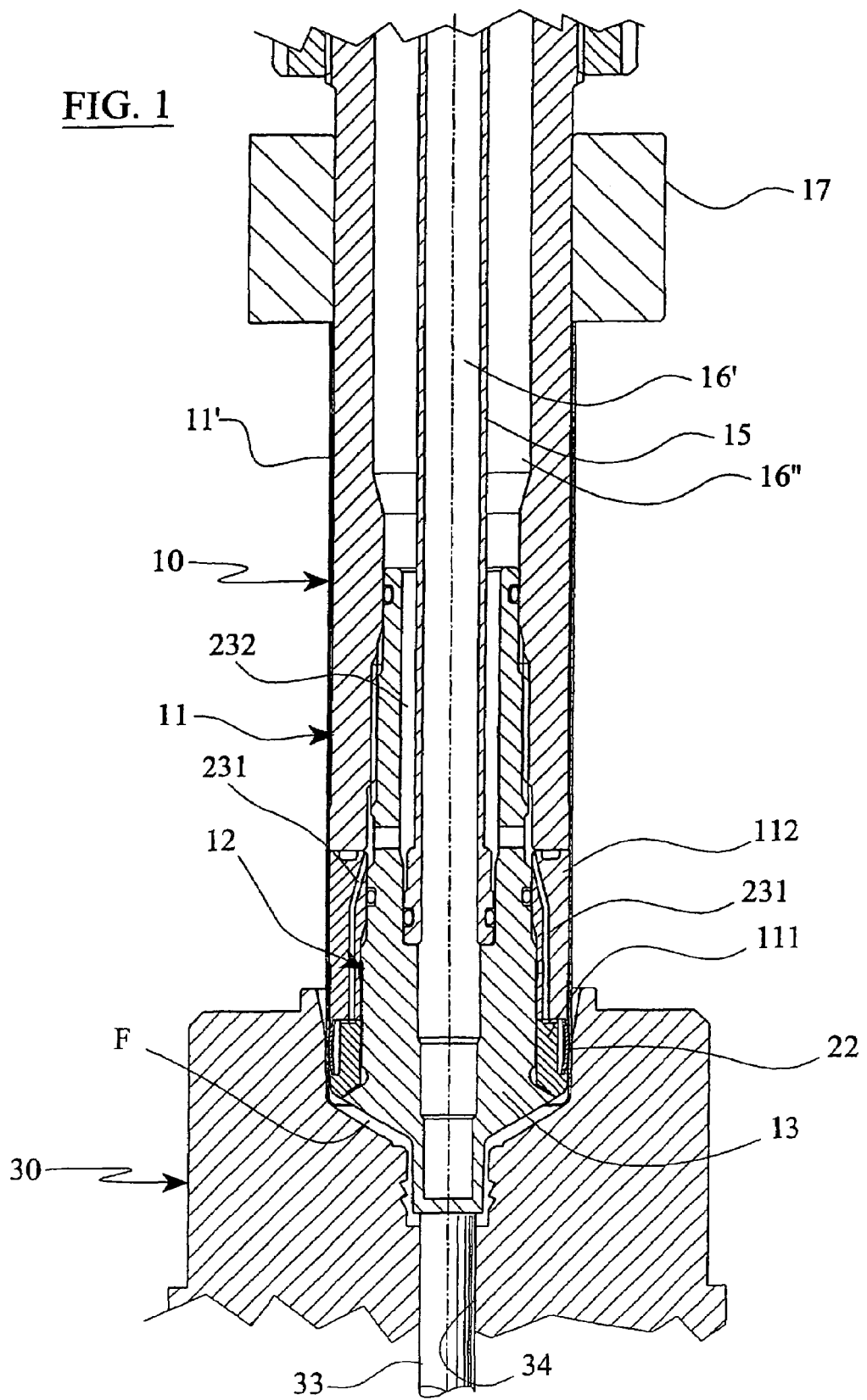
FIG. 1 is an axial section through that mould part incorporating a first embodiment of the invention.
Figure 2:
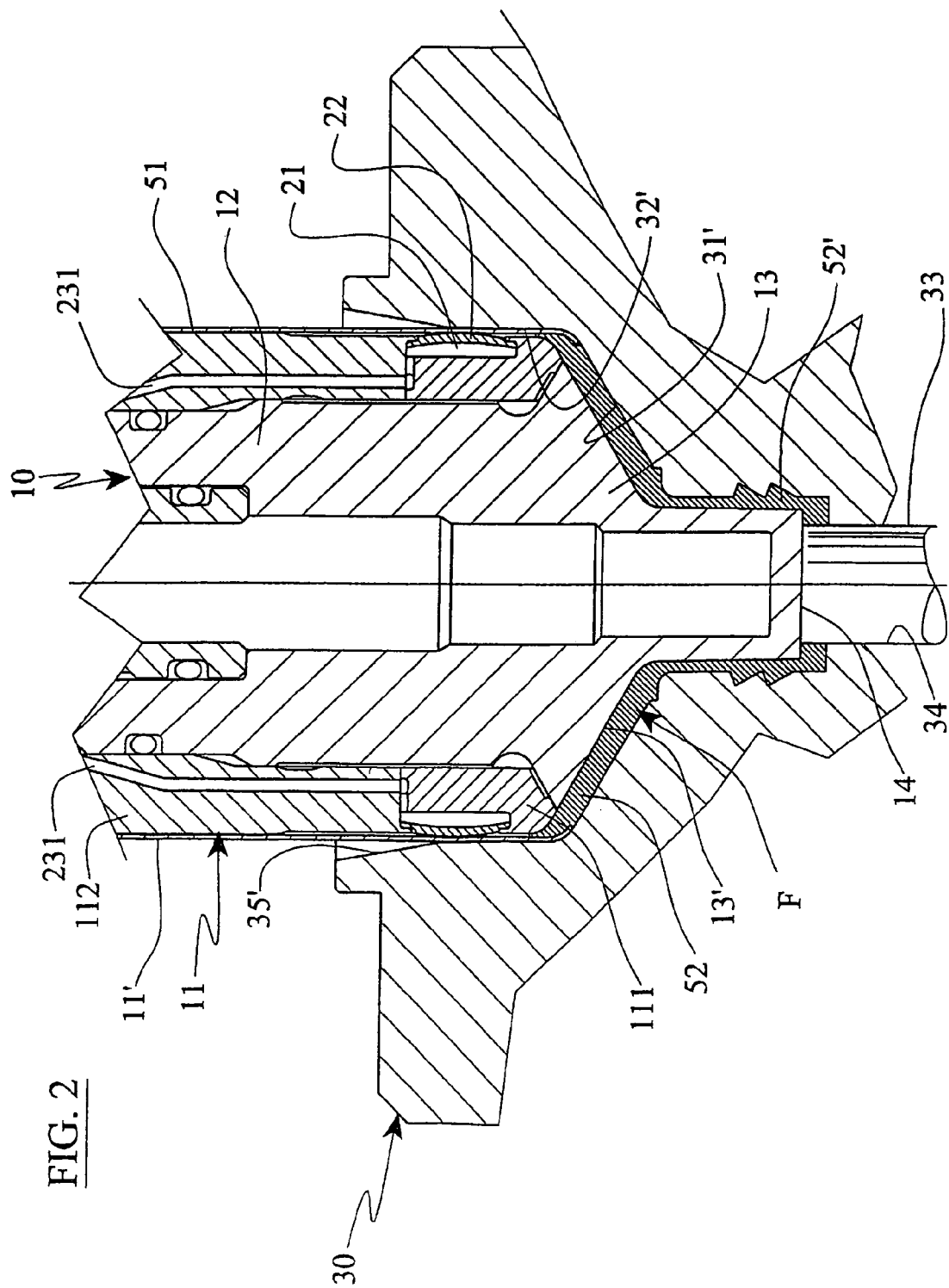
FIG. 2 is an enlarged detail of FIG. 1.

The plastic container 50 to be produced comprises a tubular body 51 and a headpiece 52 which is bonded to one end of the tubular body 51; the tubular body is formed in a previous stage, whereas the headpiece 52 is formed and simultaneously bonded to the tubular body 51 within the present mould; finally, the other end of the tubular 25 body 51 is closed in a subsequent stage.

Usually, the headpiece 52 possesses a tubular threaded mouth, through which the contents are extracted.

The mould comprises a punch 10 having an outer tube piece 11 and a coaxial inner body within the tube piece 11. The outer surface 11' of the outer tube piece 11 is cylindrical and is arranged to engage as an exact fit the tubular body 51 of the container, which is drawn over the punch 2 during its axial penetration by this latter.

The inner body 12 comprises an end portion 13 which projects axially downwards from the lower end of the outer tube piece 11 and has a lower convex surface 13' which converges overall downwards towards the axis.

In the embodiment shown in the figures, the punch 10 possesses a lowerly closed inner axial cavity in which an inner coaxial tube 15 is positioned to define an inner chamber 16' and an annular outer chamber 16''; means (of known type, not shown in the figures) are located in the inner chamber 16', for cooling the punch.

On the lateral surface of the punch 10 at a predetermined distance from the lower end of the punch, there is positioned, projecting radially outwards, a ring 17 which serves as an abutment element for the upper end of the tubular body 51, to determine the axial position thereof.

Below and coaxial to the punch 10 there is provided a die 30 (of known type and illustrated only schematically in the figures) having a concave surface 31' which, in combination with the lower surface 13' of the end portion 13 of the punch, defines a cavity F for forming the headpiece 52 of the container and for pressure-bonding it to the lower end of the tubular body 51.

Specifically, said surfaces 13' and 31' are suitably shaped to define a tubular threaded mouth 52' on the body 52; for this purpose the lower end 14 of the portion 13 is closed and is contacted by an axial cylindrical core 33 sealedly slidable axially through an axial hole 34 provided in the die 30, with suitable means (not shown in the figures) upwardly urging the core 33 which normally projects upwards from the hole 34 to a considerable extent and is moved downwards following contact by the end portion 13 when the punch 10 engages the die 30.

With the concave surface 31' of the die 30 there is associated a cylindrical concave surface 32', which lies above it as a continuation of its upper edge, to receive as an exact fit, by axial penetration, the lower end of the cylindrical outer surface 11' of the punch together with the lower end of the tubular body 51 of the container. There is also provided a frusto-conical surface 35' lying above and adjacent to the surface 32', to act as a lead-in for the penetration of the punch 10.

According to the invention, the punch comprises a radial deformation (expansion) means positioned on its cylindrical outer surface 11' and extending annularly along the entire circumference of this surface 11', to act against the inner surface of the tubular body 51 of the container in correspondence with the cylindrical concave surface 32' of the die 30.

In the first embodiment, shown in FIGS. 1, 2, 4A and 4B, the radial deformation means is positioned in an annular chamber 21 formed in the outer tube piece 11 of the punch and opening into the cylindrical outer surface 11'.

For practical and constructional reasons the outer tube piece 11 of the punch is axially divided into three segments side-by-side in the longitudinal direction, the annular chamber 21 being formed partly in the lower segment 111 and partly in the intermediate segment 112. The radial deformation means comprises a flexible annular element 22, consisting of a sleeve of elastomeric material, the axial section through which is relatively narrow and elongate in the longitudinal direction, it being positioned to close the open side of the annular chamber 21. The sleeve 22, the outer surface of which does not normally project outwards from the annular chamber 21 (see FIG. 4A), is radially locked by two annular edges 211, one upper and the other lower, which project in an axial direction towards the interior of the annular chamber 21.

By means of conduits 231 provided within the intermediate segment of the tube piece 11, and internal second conduit 232, the annular chamber 21 communicates with means (of known type, not shown in the figures) for feeding pressurized fluid (in particular air), the sleeve 22 being arranged to flex within the axial plane following the feed of pressurized fluid into the chamber 21.

Consequently, the sleeve 22 assumes a normal position in which its outer surface, the chamber 21 not being pressurized, does not project radially from the cylindrical outer surface 11' of the punch (see FIG. 4), and an active position in which, pressurized fluid having been fed into the chamber 21, it is pressed in the centrifugal direction to press against the tubular body 51 and this against the cylindrical concave surface 32' of the die (see FIG. 4B), this being the state during the forming of the container headpiece 52.

Preferably the cross-section through said flexible annular element 22 comprises an intermediate portion of greater diameter, projecting towards the opposing surface of the die (see FIGS. 5A and 5B).

During the forming operation the annular chamber 21 is initially non-pressurized, the radial deformation means hence being maintained in its normal position.

Initially, the tubular body 51 of the container is separate from the punch 10 and is drawn over the cylindrical surface 11' of the punch by the axial movement of the container tubular body 51 (see FIG. 3A), whereas the punch 10 remains at rest for the entire forming operation, As the radial deformation means is in its normal position (see FIG. 4A), the sleeve 22 does not create an obstacle to the penetration of the punch.

A ring of elastomeric material 52, the mass of which defines a predetermined blank for producing the container headpiece 52, is then inserted into the cavity of the die 30, and immediately afterwards the die 30 is moved upwards (see FIG. 3B).

In the next stage (see FIG. 3C), the lower end of the punch 10, together with the lower end of the container tubular body 51, penetrates into the cavity of the die 30, the radial deformation means being always in its normal position and hence not creating an obstacle to the axial penetration of the lower end of the cylindrical outer surface 11' of the punch (together with the lower end of the tubular body 51) within the cylindrical concave surface 32'. As soon as this penetration is complete, compressed air is fed into the chamber 21 so that the sleeve 22 flexes and is urged in the centrifugal direction to press the tubular body 51 against the cylindrical concave surface 32' of the die (see FIG. 4B).

During this stage (also shown in FIGS. 1 and 2), as a result of the mutual approach of the die and punch, the ring 55 is also compressed and, being in a pasty state, completely fills the forming chamber F to form the container headpiece 52 which simultaneously becomes bonded by thermoforming to the lower end of the tubular body 52 of the container; at the same time, the sleeve 22 creates, between the punch cylindrical surface 11' and the cylindrical concave surface 32', an annular barrier which hermetically and effectively seals the forming chamber F, to prevent seepage of plastic material and hence prevent the formation of undesired filament-like protuberances within the container 50.

In the next stage the die 30 is moved downwards away from the punch 10 and the container 50 is withdrawn from the punch (see FIG. 3D).

In the embodiment shown in FIGS. 4A and 4B the sleeve 22 acts by directly contacting the tubular body 51, whereas in the modified embodiment show in FIGS. 5A and 5B there is associated with said elastomeric sleeve 22 an outer annular metal band 24, elastically expandable in a radial direction, which is positioned on the outside of the sleeve 22 to act by contacting the tubular body 51. The annular band 24 serves to normally contain the sleeve 22 within the chamber 21 (see FIG. 5A). On feeding compressed air into the chamber 21, the sleeve 22 flexes and is urged in the centrifugal direction in such a manner as to radially expand the band 24 and cause it to press the tubular body 51 against the cylindrical concave surface 32' of the die (see FIG. 5B); in this case the edges 211 are not provided, and the chamber 21 is completely open towards the opposing die.

Figure 6B:
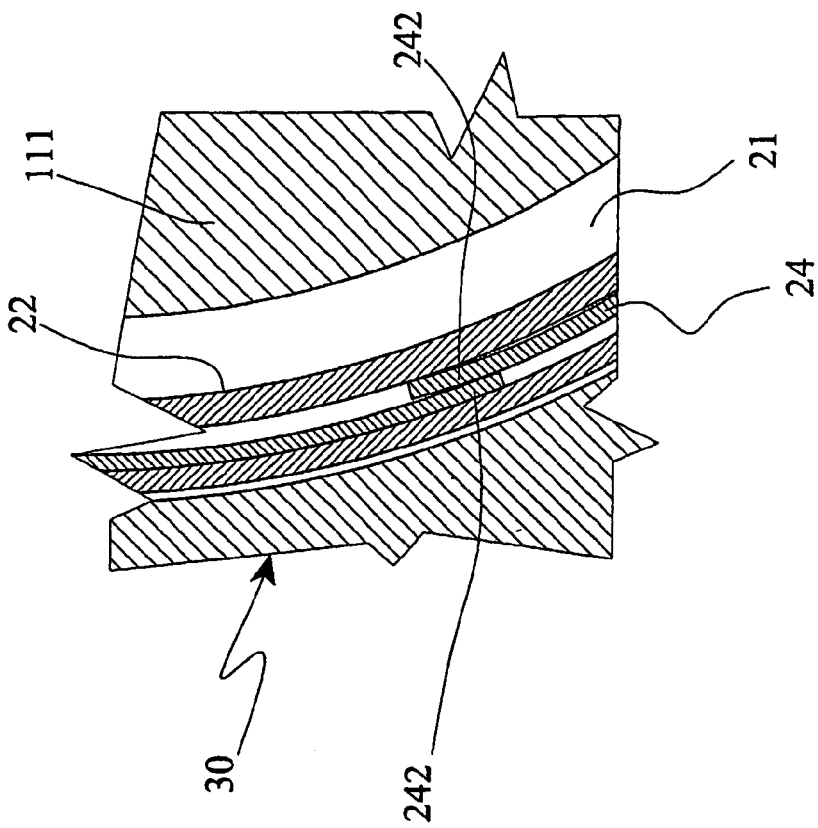
FIG. 6B shows a portion of a section taken on the transverse plane VIB-VIB of FIG. 5B, relative to a different embodiment of the second tube piece 24.
Figure 6A:
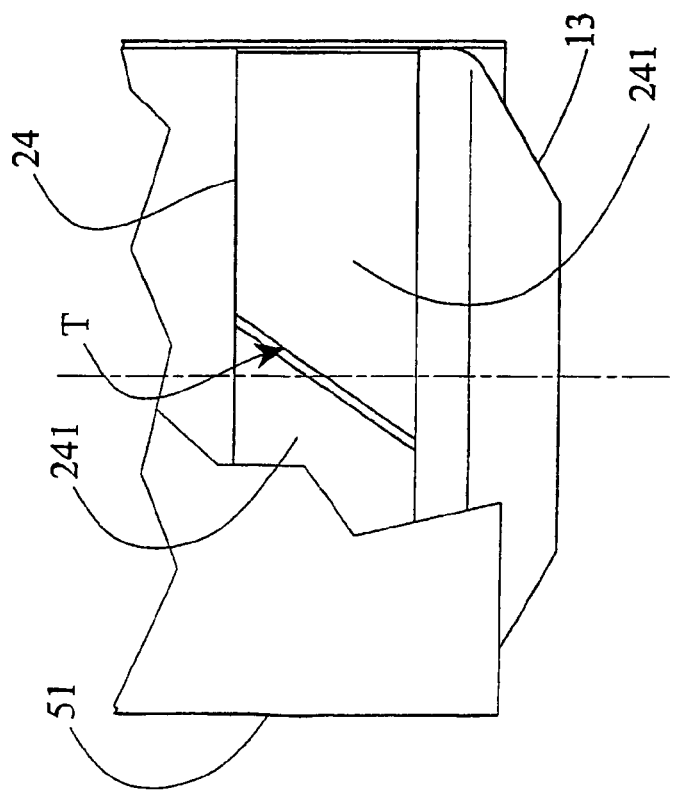
FIG. 6A is a front view of the embodiment shown in FIG. 5A.
Figure 7:
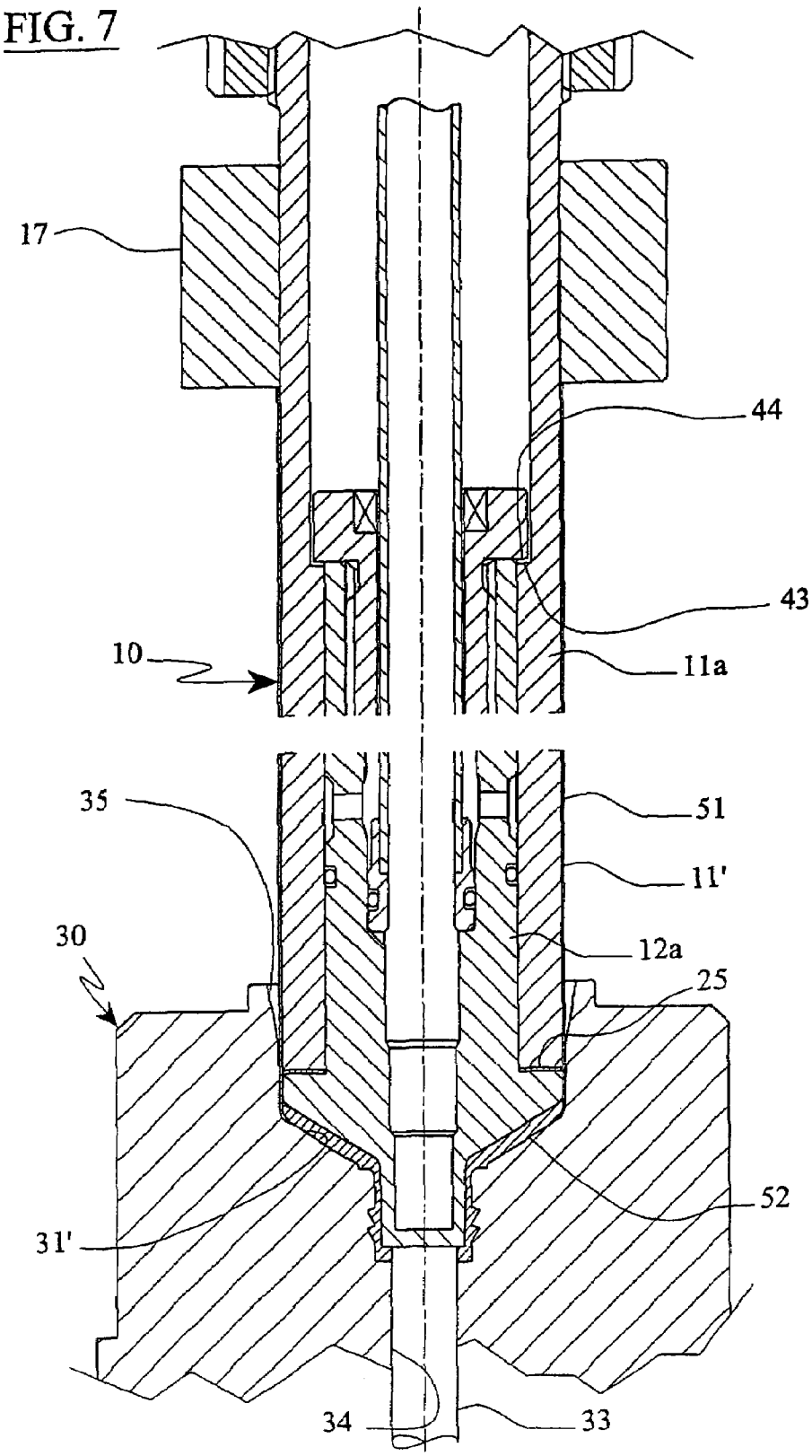
FIG. 7 is an axial section through that mould part incorporating a second embodiment of the invention.
Figure 8:
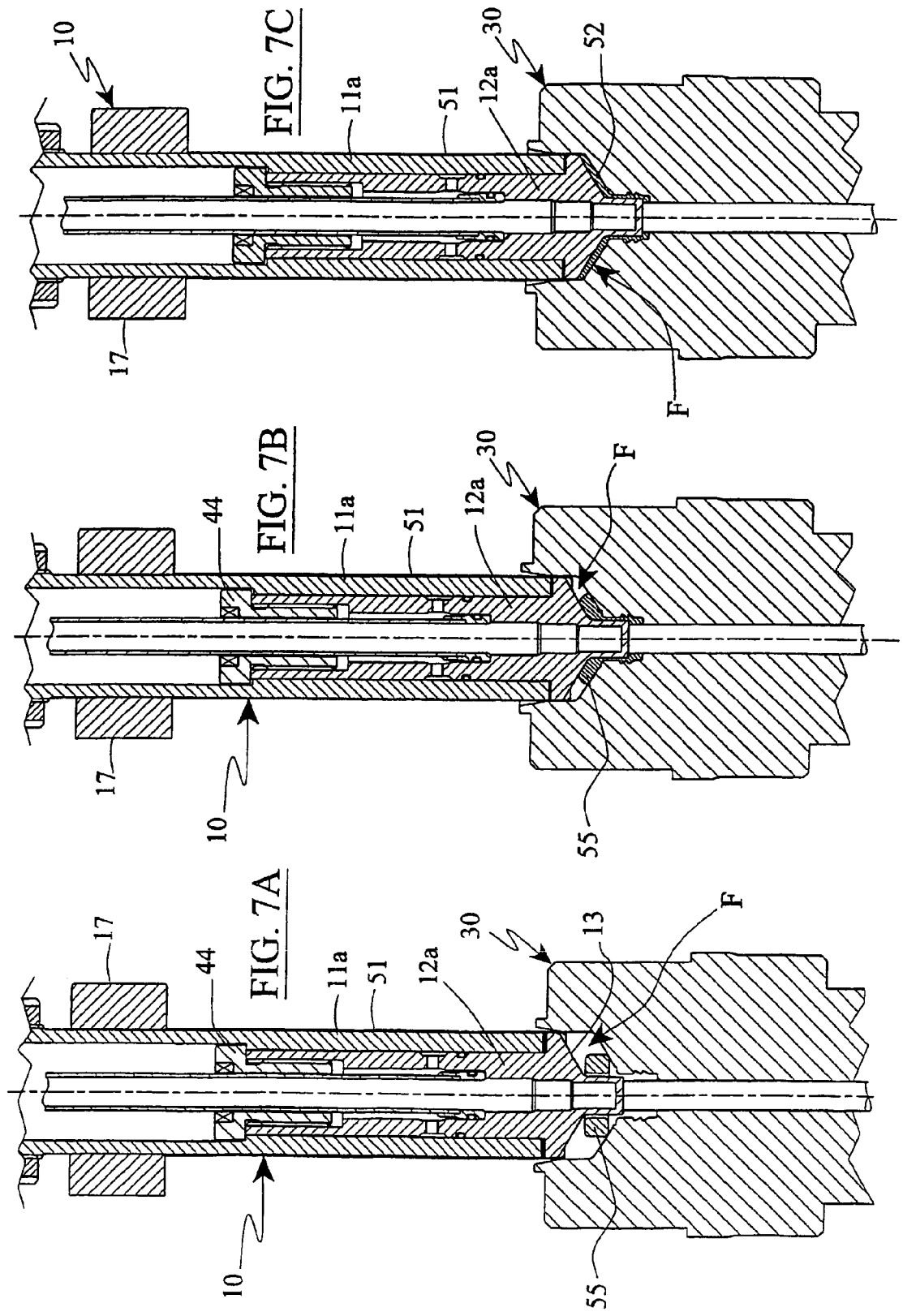
FIGS. 8A and 8B show an enlarged detail of that mould part of FIGS. 6 and 7, relative to the radial deformation means, shown in its normal position and active position respectively.

In the version shown in FIG. 6A, the outer annular band 24 is interrupted by an oblique T cut, with its ends 241 lying close to each other.

In the version shown in FIG. 6B, the outer annular band 24 is interrupted, with its ends 242 superposed and in mutual contact.

In the second embodiment, shown in FIGS. 6-9, the radial deformation (expansion) means operates following the mutual axial approach of the entering punch 10 and the cavity of the die 30. Said deformation means comprises, expandable in the radial direction, a substantially flat and normally undulated annular element 25 of elastically flexible material (for example steel), the axial section through which extends in a radial direction, and a radial annular chamber 26, provided within the punch 10 and opening into the cylindrical outer surface 11' thereof, it being of variable axial dimension.

Figure 9:
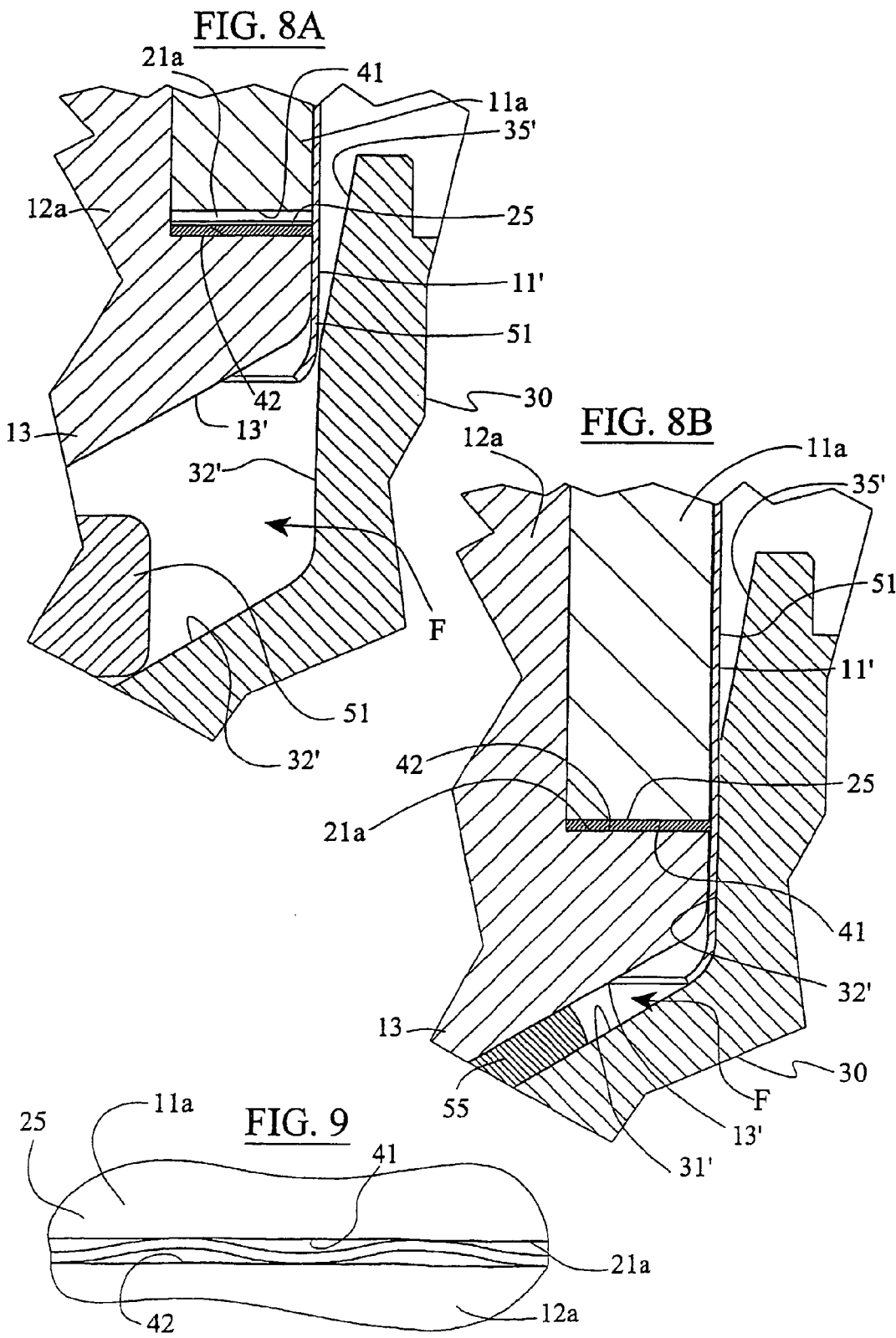
FIG. 9 is a front view of FIG. 8A.

In the embodiment shown in FIGS. 8A and 9, the expandable element 25 presents undulations along its cylindrical sections; alternatively the undulations can extend along its axial section.

In this embodiment the punch 10 comprises two parts movable relative to each other in an axial direction: a first part defined by an inner tube piece 12a, and a second part defined by an outer tube piece 11a which presents said cylindrical outer surface 11'. Said two parts 11a and 12a are movable relative to each other in an axial direction.

The inner tube piece 12a is integral with the end portion 13, which projects axially downwards from the lower end of the outer tube piece 11a, and of which the lower surface 13' defines, together with the concave surface 31' of the die 30, the forming cavity F.

The outer tube piece 11a possesses at its lower end a downwardly facing radial annular surface 41, whereas the inner tube piece 12a possesses an upwardly facing radial annular surface 42 faced a short distance therefrom by the other radial surface 41, the surfaces 41 and 42 defining the upper and respectively lower surface of the radial annular chamber 25 (see FIGS. 8A, 8B and 9 in particular).

The inner tube piece 12a possesses at its upper end a larger-diameter portion defining a downwardly facing shoulder 44 which comes into contact with a corresponding shoulder 43 provided on the inner surface of the outer tube piece 11a. The contact between the two shoulders 43 and 44 prevents the inner tube piece 12a from withdrawing downwards from the outer tube piece 11a; the said shoulders are in such mutual geometrical relationship that when they are in contact, the axial dimension (which is a maximum) of the annular chamber 26 is such as to contain the annular element 22 when in its normal configuration, i.e. released (see FIG. 8A).

The chamber 26 is arranged to contain the annular element 25 such that its outer peripheral edge normally does not project outwards from the chamber, and is able to decrease its axial dimension during the forming of the headpiece 52, following the axial approach of the punch 10 towards the cavity of the die 30, to such an extent as to cause compression of the annular element 25 and consequently its centrifugal expansion in such a manner as to press the tubular body 51 of the container against the cylindrical concave surface 32' of the die (see FIG. 8B).

The outer tube piece 11a is fixed, and in particular is rigid with a fixed part of the structure (not shown in the figures) of the machine which carries out the operation. In contrast, the inner tube piece 12a can slide axially through a short distance relative to the tube piece 11a, between a normal position in which the shoulders 43 and 44 are in mutual contact and the end portion 13 projects to its maximum extent from the outer tube piece 11a, and a retracted position in which the inner tube piece 12a has re-entered the tube piece 11a to its maximum extent and the chamber 26 reduces its axial dimension to its minimum value.

During the forming operation, the punch 10 and the die 30 are made to approach each other after drawing the tubular body 51 of the container over the outer cylindrical surface 11' of the punch and after inserting into the cavity of the die 30 a ring of elastomeric material 55, the mass of which defines a predetermined blank for forming the headpiece 52 of the container, all as already described for the first embodiment.

The shoulders 43 and 44 are initially in mutual contact, the annular chamber 21 has its maximum axial dimension, and the expandable element 25 is in its released (and hence undulated) configuration.

As the die 30 rises towards the punch 10 to compress the elastomeric ring 55 within the chamber F (as shown by the position sequence of FIGS. 7A, 7B and 7C), the axial dimension of the chamber F decreases (until the final dimension is achieved in which the material of the ring 55 completely fills the chamber).

At the same time, the thrust of the rising die 30 causes the end portion 13 to move upwards by virtue of the reaction of the material of the ring 55; this causes axial compression of the annular chamber 26 and hence compression of the expandable annular element 25, with the result that this expands in a centrifugal direction such as to press, with its outer peripheral edge, the container tubular body 51 against the cylindrical concave surface 32' of the die (see FIG. 8B).

This action is facilitated by the fact that the inner peripheral edge of the element 25 is in contact with the inner axial wall of the chamber 26 and the element 25 can expand only in a centrifugal direction.

The element 25 therefore creates, against the cylindrical concave surface 32', an annular barrier which hermetically and effectively seals the forming chamber F, to prevent seepage of plastic material and hence prevent the formation of undesired filament-like protuberances within the container 50.

Figure 10:
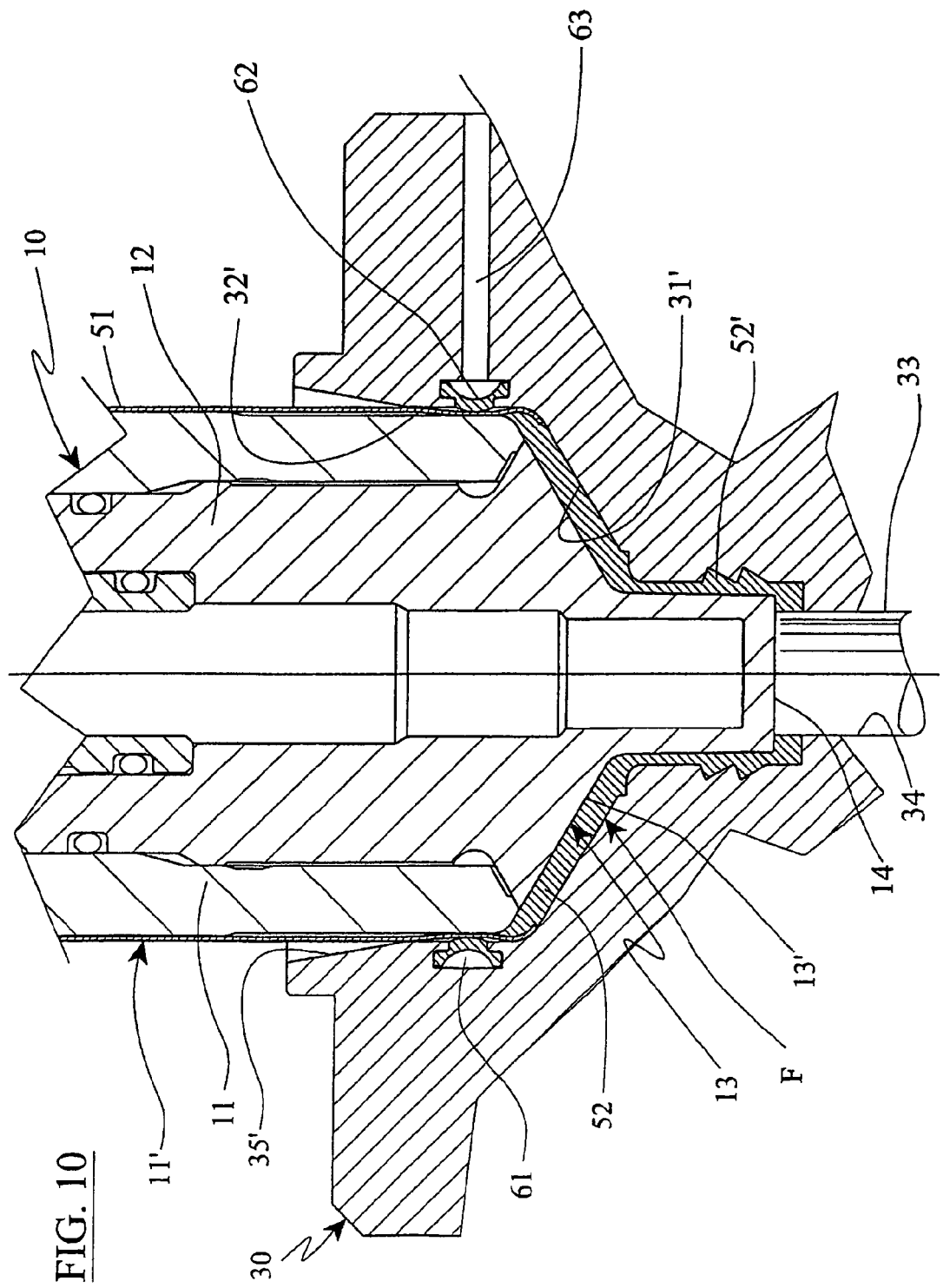
FIG. 10 is an enlarged detail, similar to FIG. 2, of a third embodiment of the invention.
Figure 12:
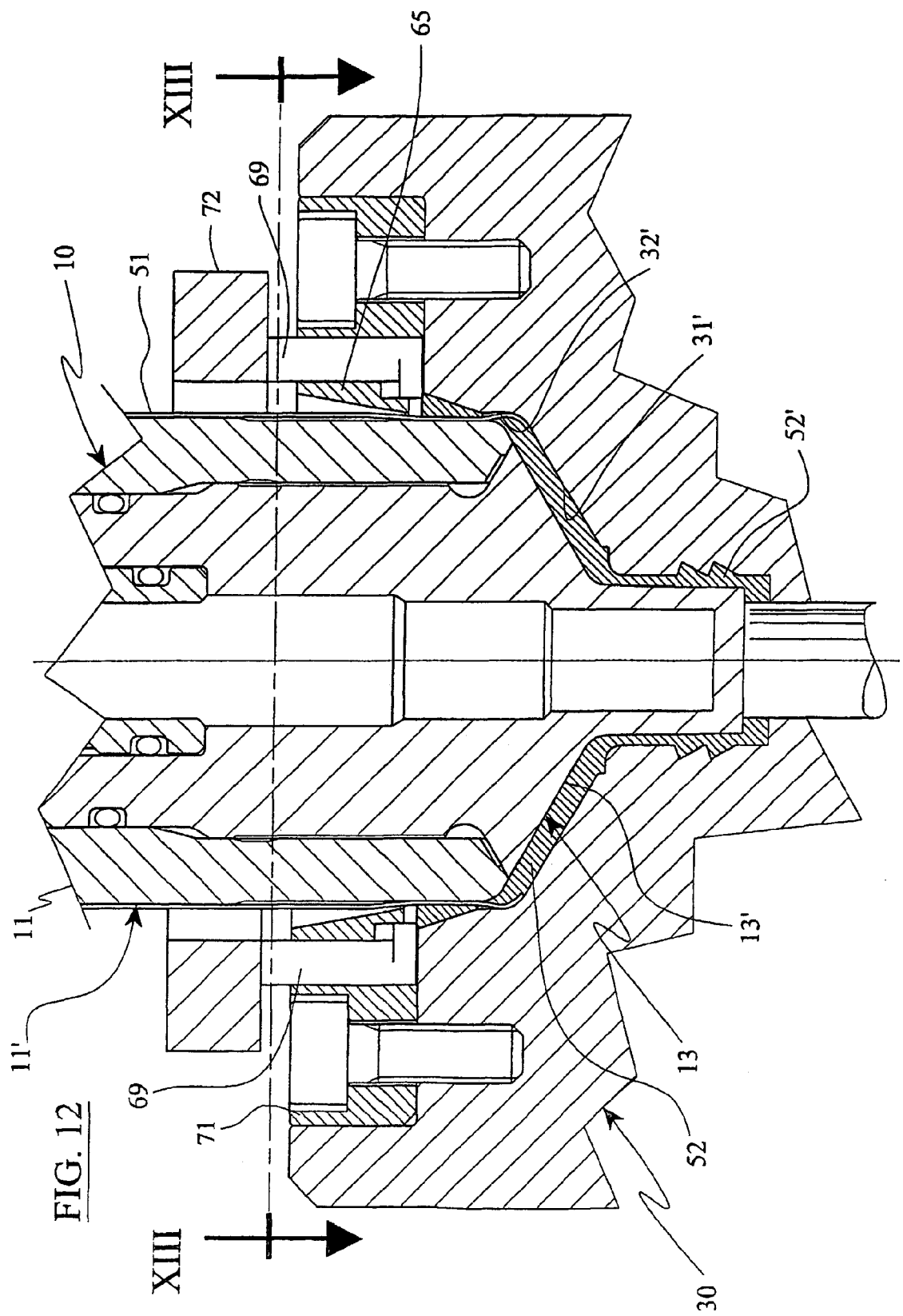
FIG. 12 is an enlarged detail, similar to FIG. 2, of a fourth embodiment of the invention.
Figure 13:
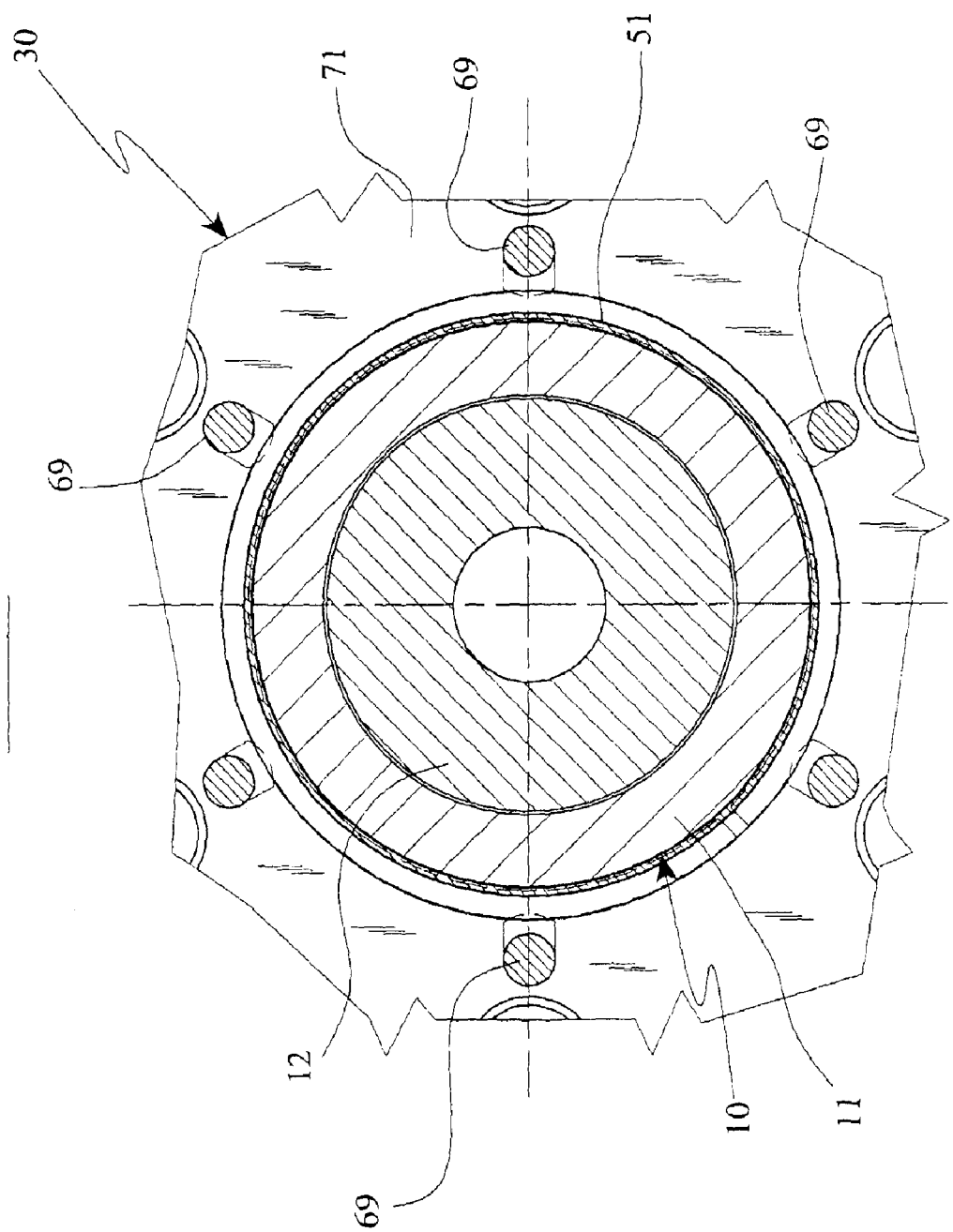
FIG. 13 is the section on the plane XIII-XIII of FIG. 12.

The third embodiment, shown in FIGS. 10, 11A and 11B, differs from the first embodiment in that the radial deformation means is positioned in an annular chamber 61, provided within the die 30 and open towards the cylindrical outer surface 32' thereof. Specifically, said means acts by directly contacting the tubular body 51 of the container and is in the form of a sleeve 62 of elastomeric material (similar to the sleeve 22 of the first embodiment), its section being relatively narrow and elongate in a longitudinal direction.

This sleeve 62 is positioned to close the annular chamber 61, its outer surface not normally projecting outwards from the annular chamber 61, i.e. beyond the line of the cylindrical surface 32'; in addition, on feeding pressurized fluid into the chamber 61 the sleeve 62 flexes within the axial plane until it presses the tubular body 51 against the opposing cylindrical surface 11' of the punch 10; in this respect, the annular chamber 61 is connected to pressurized fluid feed means (not shown in the figures) via conduits 63.

Its operation is similar to that already described for the first embodiment: the annular chamber 61 is initially not pressurized and hence the radial deformation means is maintained in its normal position; as it is in its normal position (see FIG. 11A), the sleeve 62 creates no obstacle to the penetration in an axial direction of the lower end of the punch 10, together with the lower end of the tubular body 51 of the container, into the cavity of the die 20 via the cylindrical concave surface 32'. As soon as this penetration has taken place, compressed air is fed into the chamber 61 so that the sleeve 62 flexes and acts in the centrifugal direction to press the tubular body 51 against the cylindrical surface 11' of the punch 10 (see FIG. 11B). The sleeve 22 therefore creates, between the punch cylindrical surface 11' and the cylindrical concave surface 32', an annular barrier which hermetically and effectively seals the forming chamber F, to prevent seepage of plastic material and hence prevent the formation of undesired filament-like protuberances within the container 50.

In the embodiment shown in FIGS. 10-11B, the flexible annular element 62 acts by directly contacting the tubular body 51 of the container and is locked in the radial direction by two annular edges 61 1, one upper and the other lower, which project in an axial direction towards the interior of the annular chamber 21, such that its outer surface does not normally project outwards from the annular chamber 21 (see FIG. 11A). Its cross-section comprises an intermediate portion of greater diameter which projects towards the opposing surface of the punch and is inserted between the edges 611 until flush with the cylindrical surface 31'.

In the fourth embodiment (FIGS. 12-14B), which is similar to the second embodiment (FIGS. 6-9), the radial deformation means operates following the mutual axial approach of the entering punch 10 and the cavity of the die 30. Again in this case, the radial deformation means comprises an annular element 65 deformable in the radial direction, and a radial annular chamber 66 provided within the die 30 and opening into its concave surface 32', to contain said annular element 65 such that its inner peripheral edge does not normally project outwards from the annular chamber 66, said deformation element 65 being made to contract in the radial direction as a result of the mutual axial approach of the entering punch 10 and the cavity of the die 30, such as to press the tubular body 51 against the opposing surface of the punch.

In the embodiment shown in FIGS. 12-14B, said annular chamber 66 is provided within the die 30 and possesses a surface 66' inclined downwards towards the punch 10. The contractable element 65 is preferably of very elastic steel, its circumference being interrupted by a transverse cut and its outer surface 65' being inclined, to mate with the inclined surface 66' of the chamber 66.

The punch 10 also comprises abutment means 72 movable rigidly with it, to move the contractable element 65 downwards along the inclined surface 66' of the chamber 66 following mutual axial approach of the entering punch 10 and the cavity of the die 30, to cause radial contraction of the element 65 towards the opposing surface of the punch 10.

In detail, the chamber 66 opens upperly into an upwardly facing upper horizontal surface 68 of the die 30. On the top of the ring 65 there are rested a number (six in FIG. 13) of small vertical pushers 69, angularly distributed in a regular manner about the punch 10 and resting with their upper end on the top of the ring 65. The pushers 69 are inserted axially slidable into suitable holes 71a of vertical axis, provided within a ring 71 fixed to the upper surface 68 and surrounding the annular chamber 66. If released, the ring 65 projects axially outwards for a certain distance above the upper surface 68 (see FIG. 14A), until it strikes a limit stop provided in the ring 71, to raise the pushers 69, the upper end of which projects outwards in a upward direction from the holes 71A.

With the punch 10 there is rigidly associated an abutment ring 72 to abut against the pushers 69 and to push them through a certain distance downwards.

During the forming operation, the punch 10 and the die 30 are made to approach each other, after drawing the container tubular body 51 over the outer cylindrical surface 11' of the punch and after inserting into the cavity of the die 30 a ring of elastomeric material 55, the mass of which defines a predetermined blank for producing the headpiece 52 of the container, in a manner similar to that described for the first embodiment.

The ring 65 is in its released configuration and hence does not project radially beyond the line of the cylindrical surface 32'.

Consequently the ring 65 does not hinder the penetration in the axial direction of the lower end of the punch 10, together with the lower end of the container tubular body 51, into the cavity of the die 30 via the cylindrical concave surface 32'.

As the punch 10 continues its penetration, the abutment ring 72, by way of the pushers 69, pushes the ring 65 downwards, which by the action of the mutually engaged and sliding inclined surfaces 65' and 66', contracts its diameter by projecting in a centripetal direction to press the tubular body 51 against the cylindrical surface 11' of the punch 10 (see FIG. 14B). The sleeve 22 consequently creates, between the cylindrical surface 11' of the punch 10 and the cylindrical concave surface 32', an annular barrier which hermetically and effectively seals the forming chamber F, to prevent seepage of plastic material and hence prevent the formation of undesired filament-like protuberances within the container 50.

Numerous modifications of a practical and applicational nature can be made to the invention, but without leaving the scope of the inventive idea as claimed below.

The invention claimed is:

1. A mould for forming the top of deformable tubular plastic containers comprising a tubular body (51) and a headpiece (52) of plastic material bonded to one end of the tubular body (51), the mould comprising:
   a punch (10) having an outer surface (11') arranged to engage the container tubular body (51) as an exact fit, and an end portion (13) projecting axially from the lower end of the cylindrical outer surface 8 (11') and
   a die (30) arranged to form, in combination with the lower surface (13') of the punch, a cavity (F) for forming the headpiece (52) of the container, said die (30) having a concave surface (32') arranged to receive as an exact fit, by axial penetration, the lower end of the cylindrical outer surface (11') of the punch together with the lower end of the tubular body (51) of the container,
   the headpiece (52) being formed within the forming cavity (F) and being pressure-bonded therein to the lower end of the tubular body (51),
   the punch (10)/die (30) comprising a radial deformation means (22, 20 25, 62, 65), positioned on its outer surface (11')/concave surface (32'), which extends annularly along the entire circumference of this surface to act on the tubular body (51) of the container, and is arranged to assume a normal position in which its outer surface does not project radially from the cylindrical outer surface (11') of the punch/from the concave surface (32') of the die (30), and an active position in which it is urged in a radial direction in such a manner as to press the tubular body (51) against the opposing surface of the die/punch, characterised in that
   said radial deformation means are positioned within an annular chamber (21, 61) which is provided in the punch (10)/die (30), is open towards the cylindrical outer surface (11') of the punch/the concave inner surface (32') of the die, and is in the form of a flexible annular element (22, 62) positioned to close the annular chamber (21, 61) but with its outer surface not normally projecting from the annular chamber (21, 61), said annular element (22, 62) being arranged to deform radially until it presses the tubular body (51) against the opposing surface (32') of the die (30)/against the opposing surface (11') of the punch, as the result of feeding pressurised fluid into the chamber (21, 61).

2. A mould as claimed in claim 1, characterised in that said flexible annular element (22, 62) acts by directly contacting the tubular body (51) of the container.

3. A mould as claimed in claim 1, characterised in that said flexible annular element (22, 62) is in the form of a sleeve of elastomeric material, the section through which is relatively narrow and elongate in a longitudinal direction.

4. A mould as claimed in claim 3, characterised in that the cross section through said flexible annular element (22, 62) comprises an intermediate larger/narrower-diameter portion projecting towards the opposing surface of the die/punch.

5. A mould for forming the top of deformable tubular plastic containers comprising a tubular body (51) and a headpiece (52) of plastic material bonded to one end of the tubular body (51), the mould comprising:
   a punch (10) having an outer surface (11') arranged to engage the container tubular body (51) as an exact fit and an end portion (13) projecting axially from tie lower end of the cylindrical outer surface 8 (11') and
   a die (30) arranged to form, in combination with the lower surface (13') of the punch, a cavity (F) for forming the headpiece (52) of the container, said die (30) having a concave surface (32') arranged to receive as an exact fit, by axial penetration, the lower of the cylindrical outer surface (11') of the punch together with the lower end of the tubular body (51) of the container,
   the headpiece (52) being formed within the forming cavity (F) and being pressure-bonded therein to the lower end of the tubular body (51),
   the punch (10)/die (30) comprising a radial deformation means (22, 20 62, 65), positioned on its outer surface (11')/concave surface (32') which extends annularly along the entire circumference of this surface to act on the tubular body (51) of the container, and is arranged to assume a normal position in which its outer surface does not project radially from the cylindrical outer surface (11') of the punch/from the concave surface (32') of the die (30), and an active position in which it is urged in a radial direction in such a manner as to press the tubular body (51) against the opposing surface of the die/punch, characterised in that
   said radial deformation means are positioned within an annular chamber (21, 61) which is provided in the punch (10)/die (30), is open towards the cylindrical outer surface (11') of the punch/the concave inner surface (32') of the die, and is in the form of a flexible annular element (22, 62) positioned to close the annular chamber (21, 61) but with its outer surface not normally projecting from the annular chamber (21, 61), said annular element (22, 62) being arranged to deform radially until it presses the tubular body (51) against the opposing surface (32') of the die (30)/against the opposing surface (11') of the punch, as the result of feeding pressurised fluid into the chamber (21, 61); said flexible annular element (22, 62) is in the form of a sleeve or elastomeric material, the section through which is relatively narrow and elongate in a longitudinal direction; and
      with said flexible annular element (22) there is associated a second metal sleeve (24) elastically flexible in radial direction, and interposed between the tubular body (51) and the sleeve of elastomeric material (22).

6. A mould as claimed in claim 1, characterised in that said radial deformation means comprises a normally undulated annular element (25) of elastically flexible material, the axial section through which extends in a radial direction, and a radial annular chamber (26) provided within the punch (10) and opening into the cylindrical outer surface (11') thereof, it being of variable axial dimension and being arranged to contain said annular element (25) in such a manner that the outer peripheral edge of this latter does not normally project outwards from the annular chamber (26), said annular chamber (26) being able to decrease its axial dimension during the forming of the headpiece (52) to such an extent as to cause compression of the annular element (25), with its consequent radial expansion such that it presses the tubular body (51) against the cylindrical concave surface (32) of the die.

7. A mould as claimed in claim 6, characterised in that the punch (10) comprises two parts movable relative to each other in an axial direction, a first part (12*a*) rigid with the end portion (13) and having an upwardly facing radial surface (42), and a second part (11*a*) which presents said cylindrical outer surface (11') and has a downwardly facing radial surface (41), said radial surfaces (41, 42) facing each other and defining the lower and respectively upper surface of said radial annular chamber (26).

8. A mould as claimed in claim 1, characterised in that said radial deformation means comprises an annular element (65), contractable in a radial direction, and a radial annular chamber (66) provided within the die (30) and opening into its concave surface (32) to contain said annular element (65) in such a manner that the inner peripheral edge of this latter does not normally project outwards from the annular chamber (66), said contractable element (65) being made to contract in a radial direction as a result of the mutual axial approach of the entering punch (10) and the cavity of the die (30), in such a manner as to press the tubular body (51) against the opposing surface of the punch.

9. A mould as claimed in claim 8, characterised in that:
said annular chamber (66) is provided within the die (30) and possesses a surface (66') inclined downwards towards the punch (10),
said deformable element (65) possesses an inclined outer surface (65') which mates with the inclined surface of the chamber (66), and
the punch comprises abutment means (72) movable rigidly with it, to move the deformable element (65) downwards along the inclined surface (66') of the chamber (66) following mutual axial approach of the entering punch (10) and the cavity of the die (30), to cause radial contraction of the element (65) towards the opposing surface of the punch (10).

* * * * *